US012485422B2

(12) United States Patent
Bashar et al.

(10) Patent No.: US 12,485,422 B2
(45) Date of Patent: Dec. 2, 2025

(54) TRAY FOR TRANSFERING SOLID REAGENTS TO A MULTI-WELL CARTRIDGE

(71) Applicant: GEN-PROBE INCORPORATED, San Diego, CA (US)

(72) Inventors: Reza Bashar, San Diego, CA (US); Andrew Kindred, San Diego, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 0 days.

(21) Appl. No.: 18/745,420

(22) Filed: Jun. 17, 2024

(65) Prior Publication Data

US 2024/0408602 A1 Dec. 12, 2024

Related U.S. Application Data

(63) Continuation of application No. 17/419,839, filed as application No. PCT/US2019/068570 on Dec. 26, 2019, now abandoned.

(Continued)

(51) Int. Cl.
*B01L 3/00* (2006.01)

(52) U.S. Cl.
CPC ......... *B01L 3/527* (2013.01); *B01L 2200/021* (2013.01); *B01L 2200/025* (2013.01); *B01L 2200/0647* (2013.01); *B01L 2200/16* (2013.01); *B01L 2300/0609* (2013.01); *B01L 2300/0829* (2013.01); *B01L 2300/12* (2013.01); *B01L 2300/16* (2013.01)

(58) Field of Classification Search
CPC ............... B01L 3/527; B01L 2200/021; B01L 2200/025; B01L 2200/0647; B01L 2200/16; B01L 2300/0609; B01L 2300/0829; B01L 2300/12; B01L 2300/16
See application file for complete search history.

(56) References Cited

U.S. PATENT DOCUMENTS

| | | | |
|---|---|---|---|
| 3,461,643 | A | 8/1969 | Strand |
| 5,737,902 | A | 4/1998 | Aylward |

(Continued)

FOREIGN PATENT DOCUMENTS

| | | | |
|---|---|---|---|
| EP | 1693299 | A1 | 8/2006 |
| EP | 1943148 | B1 | 4/2009 |

(Continued)

OTHER PUBLICATIONS

International Search Report and Written Opinion dated Jun. 29, 2020 in International Application No. PCT/US2019/068570 (16 pages).

(Continued)

*Primary Examiner* — Jill A Warden
*Assistant Examiner* — Michael Stanley Gzybowski
(74) *Attorney, Agent, or Firm* — Rothwell, Figg, Ernst & Manbeck, P.C.; Charles B. Cappellari

(57) ABSTRACT

A tray for transferring a plurality of solid reagents to a multi-well cartridge, the tray including a top surface having a plurality of depressions formed therein, each depression being configured to receive and hold a single one of the solid reagents, and a barrier wall projecting above and substantially surrounding the top surface, where the barrier wall is discontinuous at a first end of the tray.

20 Claims, 11 Drawing Sheets

Related U.S. Application Data

(60) Provisional application No. 62/786,717, filed on Dec. 31, 2018.

(56) References Cited

U.S. PATENT DOCUMENTS

| | | | |
|---|---|---|---|
| 6,925,774 B2 | 8/2005 | Peterson | |
| 7,386,970 B2 | 6/2008 | Richwine | |
| 7,486,166 B2 | 2/2009 | Humphries et al. | |
| 7,807,448 B2 | 10/2010 | Glezer et al. | |
| 8,091,319 B2 | 1/2012 | Ream et al. | |
| 9,051,106 B2 | 6/2015 | Milano | |
| 9,119,794 B2 | 9/2015 | Middelbeek et al. | |
| 9,162,228 B2 | 10/2015 | Knight | |
| 2006/0275182 A1 | 12/2006 | Hudson | |
| 2009/0004754 A1 | 1/2009 | Oldenburg | |
| 2014/0027333 A1 | 1/2014 | Pawlowski et al. | |
| 2015/0024436 A1 | 1/2015 | Eberhart et al. | |
| 2015/0064082 A1 | 3/2015 | Morris et al. | |
| 2015/0283036 A1* | 10/2015 | Aggarwal | A61J 7/0436 206/534 |
| 2016/0108392 A1 | 4/2016 | Stelling et al. | |
| 2017/0065487 A1 | 3/2017 | DeVita et al. | |
| 2018/0127120 A1 | 5/2018 | Broadbent et al. | |

FOREIGN PATENT DOCUMENTS

| | | |
|---|---|---|
| EP | 2420824 A2 | 2/2012 |
| EP | 2962944 B1 | 11/2016 |
| EP | 2955116 B1 | 12/2016 |
| EP | 3199463 B1 | 4/2018 |
| EP | 3318497 A1 | 5/2018 |
| WO | 1999054209 A1 | 10/1999 |
| WO | 2007036256 A1 | 4/2007 |
| WO | 2015126667 A1 | 8/2015 |

OTHER PUBLICATIONS

International Preliminary Report on Patentability and Written Opinion dated Jun. 16, 2021 in International Application No. PCT/US2019/068570 (11 pages).

Non-Final Office Action dated Jan. 18, 2024 in related U.S. Appl. No. 17/419,839 (15 pages).

* cited by examiner

TRAY FOR TRANSFERING SOLID REAGENTS TO A MULTI-WELL CARTRIDGE

CROSS-REFERENCE TO RELATED APPLICATIONS

This application is a continuation of U.S. application Ser. No. 17/419,839, filed Jun. 30, 2021, now abandoned, which is a National Stage Application under 35 U.S.C. § 371 of International Application No. PCT/US2019/068570, filed Dec. 26, 2019, which claims the benefit of priority from U.S. Provisional Application No. 62/786,717, filed on Dec. 31, 2018, each of which are incorporated by reference herein in their entireties.

TECHNICAL FIELD

The present disclosure relates to manual and/or automated systems and methods for filling multi-well cartridges with solid reagents, such as, for example, lyophilized reagents.

BACKGROUND

Automated analyzers offer numerous advantages, including the capacity to simultaneously process large numbers of samples. To enable such high capacity processing of samples, automated analyzers may utilize multi-well cartridges that contain a plurality of segregated solid reagents used to carry out one or more analytic steps. The solid reagents may be directly reconstituted in the cartridges prior to exposing them to sample material. The reconstituted reagents may be combined with sample material in the cartridges or in distinct processing vials. Existing methods for loading solid reagents into multi-well cartridges can be labor intensive and time consuming, and run the risk of damaging the solid reagents during the loading process. Damage to the solid reagents (e.g., breaking or flaking) can lead to unexpectedly low concentrations of reconstituted forms of the reagents, thereby potentially affecting the results of analytical procedures using the reconstituted reagents.

SUMMARY

Embodiments of the disclosure may include one or more of the features set forth in this section.

In one aspect, the disclosure is directed to a tray for transferring a plurality of solid reagents to a multi-well cartridge. The tray includes a top surface having a plurality of depressions formed therein, each depression being configured to receive and hold a single one of the solid reagents; and a barrier wall projecting above and substantially surrounding the top surface, wherein the barrier wall is discontinuous at a first end of the tray.

The top surface of the tray may be generally flat. The top surface may have a contrasting color to enable visual confirmation that each depression contains a single one of the solid reagents. The top surface may have a dark, anodized finish. The top surface may be magnetized or include a magnet(s).

The depressions formed in the tray may be arranged in one or more rows. The depressions may be arranged in two or more pairs of rows. A bottom portion of each depression may have a hemispherical shape.

The tray may include a plurality of conduits, each conduit extending from a bottom surface of one of the plurality of depressions to a bottom surface of the tray. Each of the conduits may have a cylindrical shape.

The barrier wall of the tray may have opposed first and second end wall portions at the first end of the tray, the first and second end wall portions defining an opening for removing excess solid reagents from the tray. The first and second end wall portions may be arranged obliquely relative to each other. The first and second end wall portions may be mirror images of each other. The barrier wall may further comprise opposed first and second side wall portions, the first and second side wall portions being continuous with the first and second end wall portions, respectively. The barrier wall may further comprise a third end wall portion at a second end of the tray opposite the first end, the first and second side wall portions being continuous with the third side wall portion. The third end wall portion may comprise a cut-out positioned above the top surface. At least a portion of an interior edge of the barrier wall may be chamfered.

The tray may be formed from a metal, such as aluminum.

In another aspect, the disclosure is directed to a press plate for receiving and holding multiple cartridges in a frictional fit. The press plate includes a receiving member comprising a generally flat bottom surface and a top surface having multiple sets of parallel ridges extending upward therefrom, where an outer edge of each ridge of each set of parallel ridges is chamfered, and where each set of parallel ridges is configured to engage a cartridge in a frictional fit; and a handle member integrally formed with or joined to the receiving member.

The receiving member and the handle member of the press plate may form a T-shape, where the handle member forms the top of the T-shape. The handle member may have a first side and a second side, the first and second sides having different shapes. The first side may have a generally straight end surface, where the second side may have an angled end surface. One of the first and second sides may comprise an alphanumeric symbol. The handle member may have a top surface and a bottom surface, where the handle member defines opposed first and second grooves formed in the top and bottom surfaces of the handle member, respectively. Alternatively, the handle member may have a top surface and a bottom surface, where the handle member defines an opening extending from the top surface to the bottom surface of the handle member. Each of the grooves or the opening may have an oval shape. The top and bottom surfaces of the handle member surrounding the first and second grooves or the opening may be beveled.

The receiving member of the press plate may comprise at least four sets of parallel ridges.

The press plate may be formed from a single piece of plastic.

In another aspect, the disclosure is directed to a combination. The combination includes a press plate as set forth above; and multiple cartridges, each cartridge having opposed side walls, and each of the opposed side walls having an inner surface, where each set of parallel ridges of the press plate presses against the inner surfaces of the opposed side walls of a corresponding cartridge, thereby engaging the corresponding cartridge in the frictional fit.

Each cartridge of the combination may comprise a top surface having a plurality of wells depending therefrom, where the opposed side walls depend from the top surface. The plurality of wells of each cartridge may be formed in at least one row of wells. The plurality of wells of each cartridge may be formed in two rows of wells. Each cartridge may have a first end and a second end, where at least one of the first and second ends is configured for engagement by a linear transport mechanism. The first end may be configured for engagement with a linear transport mechanism, and the second end may comprise snap fingers configured to grasp an element of an instrument for securing the cartridge to the element. Each cartridge may be formed from a transparent plastic.

In another aspect, the disclosure is directed to a system for transferring solid reagents to a plurality of wells of multiple cartridges. The system includes a press plate as set forth above; and a cartridge ring for supporting multiple cartridges, the cartridge ring having inner and outer surfaces, where the inner surface defines multiple slots, each slot having first and second ends configured to support first and second ends of a corresponding cartridge, respectively, and where the top surface of the press plate is configured to receive and position the cartridge ring, such that each slot of the cartridge ring is aligned with one set of parallel ridges.

The cartridge ring of the system may be formed from a metal, such as aluminum. At least a portion of a top end of the cartridge ring may be magnetized.

In another aspect, the disclosure is directed to a method for simultaneously transferring a plurality of solid reagents to multiple cartridges. The method comprises the steps of dispensing a plurality of solid reagents onto the top surface of a tray as set forth above; changing the plane of the tray so that each depression receives one of the solid reagents; removing any excess solid reagents through a discontinuity in the barrier wall at the first end of the tray; aligning each of multiple cartridges with a subset of the depressions, each cartridge including a plurality of wells, and each well being associated with one of the depressions; inverting the tray and the aligned cartridges so the solid reagents are simultaneously deposited into the wells of the cartridges; removing the cartridges from the tray; and sealing the wells of the cartridges with a moisture barrier.

The method may further comprise, prior to step (d), the step of pressing each cartridge onto a press plate as set forth above, such that the opposed side walls of each cartridge engage the outer edges of the ridges of one set of parallel of ridges, thereby deflecting the opposed sidewalls outward so that the opposed sidewalls and the corresponding set of parallel ridges are in frictional engagement.

The method may further comprise, prior to step (d), the steps of: supporting each cartridge in one of multiple slots of a cartridge ring, the cartridge ring having an inner surface and an outer surface, where the inner surface defines the multiple slots, each slot having a first end and a second end configured to support a first end and a second end of a corresponding cartridge, respectively; and while each cartridge is supported by the corresponding slot, pressing each cartridge onto a press plate as set forth above, such that the opposed side walls of each cartridge engage the outer edges of the ridges of one of the parallel sets of ridges, thereby deflecting the opposed sidewalls outward so that the opposed sidewalls and the corresponding parallel set of ridges are in frictional engagement, where the top surface of the press plate is configured to receive the cartridge ring so that each slot is aligned with one of the parallel sets of ridges during step (d). At least a portion of the cartridge ring may be contained within the barrier wall of the tray during step (d). The cartridge ring may be magnetically attracted to the tray during steps (d) and (e). The multiple cartridges may be supported by the cartridge ring during step (f). The multiple cartridges may be supported by the cartridge ring during step (g).

The method may further comprise the step of deionizing the top surface of the tray prior to step (a).

The method may further comprise, after step (c) and prior to step (d), the step of inspecting the top surface of the tray to ensure that each well contains a single one of the solid reagents. The plurality of solid reagents and the top surface of the tray may have contrasting colors. The inspecting step may be a visual inspection.

The method may further comprise the steps of removing a couplet from at least one of the wells and replacing the couplet with a single solid reagent, the couplet being a fused pair of the plurality of solid reagents provided to the top surface of the tray in step (a).

Each of the plurality of solid reagents may be a lyophilized reagent, and each of the plurality of solid reagents may have a generally spherical shape.

Step (d) of the method may comprise contacting a top surface of each cartridge with the top surface of the tray.

Steps (a) to (e) of the method may be performed in a humidity controlled environment (e.g., a glove box).

Each cartridge of the method may comprise two rows of wells, where the depressions may be arranged in sets of two rows corresponding to the two rows of wells in each cartridge. Each cartridge may be formed from a transparent plastic.

The method may further comprise, after step (f) and prior to step (g), the step of inspecting each well of each cartridge to confirm that each well contains a single solid reagent.

DESCRIPTION OF THE DRAWINGS

The accompanying drawings, which are incorporated herein and form part of the specification, illustrate various, non-limiting embodiments of the present disclosure. Where appropriate, reference numerals illustrating like structures, components, materials and/or elements in different drawings are labeled similarly. It should be understood that various combinations of the structures, components, and/or elements, other than those specifically shown in these drawings, are contemplated and are within the scope of the present disclosure.

For simplicity and clarity of illustration, the drawings depict the general structure and/or manner of construction of the described embodiments, as well as associated methods of manufacture. Well-known features (e.g., fasteners, electrical connections, control systems, etc.) are not shown in these drawings (and are not described in the corresponding description for brevity) to avoid obscuring other features, since these features are well known to those of ordinary skill in the art. The features in the drawings are not necessarily drawn to scale. The dimensions of some features may be exaggerated relative to other features to improve understanding of the exemplary embodiments. Cross-sectional views are simplifications provided to help illustrate the relative positioning of various features. One skilled in the art would appreciate that the cross-sectional views are not drawn to scale and should not be viewed as representing proportional relationships between different features. It should be noted that, even if it is not specifically mentioned, aspects and features described with reference to one embodiment may also be applicable to, and may be used with, other embodiments.

DETAILED DESCRIPTION

Figure 1:
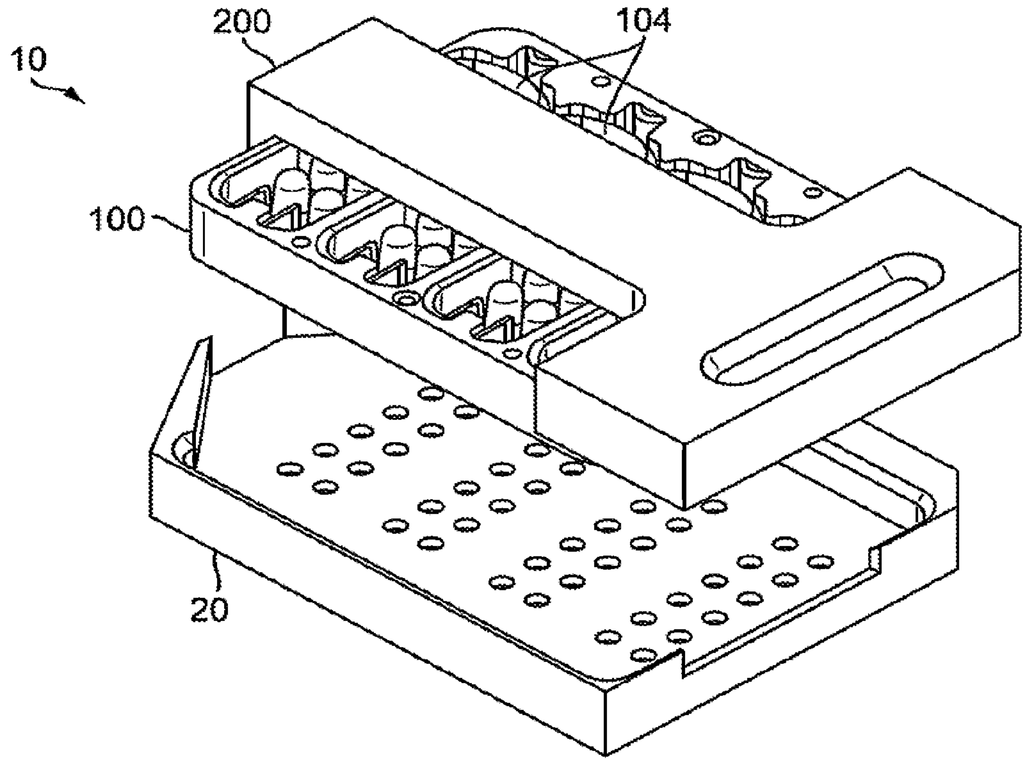
FIG. 1 is a perspective view of a system for loading solid reagents into one or more cartridges.
Figure 2:
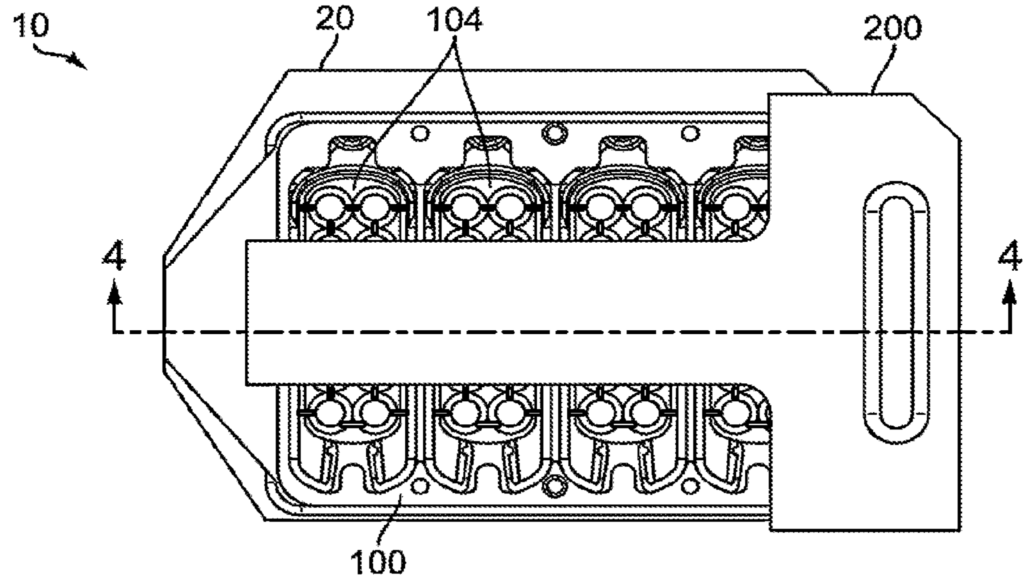
FIG. 2 is a top view of the system shown in FIG. 1.
Figure 3:
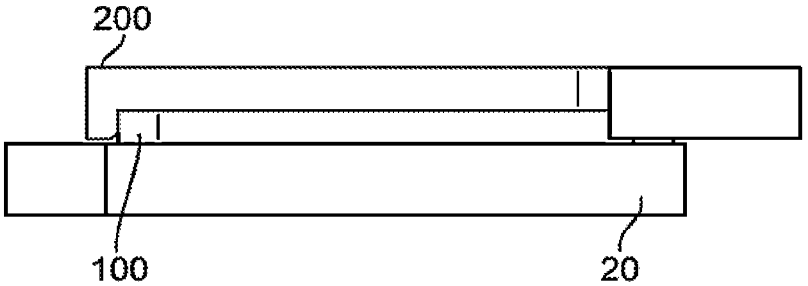
FIG. 3 is a side view of the system shown in FIG. 1.

All documents referred to herein, or the indicated portions, are hereby incorporated by reference herein. No document, however, is admitted to be prior art to the claimed subject matter.

Unless defined otherwise, all terms of art, notations and other scientific terms or terminology used herein have the same meaning as is commonly understood by one of ordinary skill in the art to which this disclosure belongs. If a definition set forth in this disclosure is contrary to, or otherwise inconsistent with, a definition in these incorporated documents, the definition set forth in this disclosure prevails over the definitions that are incorporated herein by reference.

References in the specification to "one embodiment," "an embodiment," a "further embodiment," "an example embodiment," "some aspects," "a further aspect," "aspects," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic is also a description in connection with other embodiments whether or not explicitly described. As used herein, "a" or "an" means "at least one" or "one or more."

A "unit-dose reagent" as used herein refers to a reagent provided in an amount or concentration sufficient for use in performing one or more steps of a single assay or test.

An "automated analyzer" as used herein refers to any instrument capable of performing one or more steps of an analytical procedure with limited or no human intervention. Such analytical procedures may include nucleic acid-based assays, including nucleic acid-based amplification assays (e.g., PCR), immunoassays, and/or chemical assays. Non-limiting examples of automated analyzers include the Tigris®, Panther® and Panther Fusion® systems sold by Hologic, Inc., Marlborough, Mass.

A "reagent" as used herein refers to a substance or mixture for use in a biological, chemical and/or biochemical reaction.

The term "lyophilized" as used herein refer to a process by which a material to be dried is first frozen and then the ice or frozen solvent is removed by sublimation in a vacuum environment. "Lyophilisate" refers to lyophilized material. A "lyophilized reagent" is a lyophilisate comprising at least one reagent.

A "reconstitution solution" as used herein refers to a solvent (including water, organic solvents, and mixtures thereof) or buffer that can be used to dissolve another substance, such as a dried substance (e.g., lyophilizate).

"Probe" as used herein refers to an oligomer that interacts with a target nucleic acid to form a detectable complex. A probe's target sequence generally refers to the specific sequence within a larger sequence (e.g., gene, amplicon, locus, etc.) to which the probe specifically hybridizes. A detection oligomer can include target-specific sequences and a non-target-complementary sequence. Such non-target-complementary sequences can include sequences which will confer a desired secondary or tertiary structure, such as a flap or hairpin structure, which can be used to facilitate detection and/or amplification (e.g., U.S. Pat. Nos. 5,118,801, 5,312,728, 6,835,542, 6,849,412, 5,846,717, 5,985,557, 5,994,069, 6,001,567, 6,913,881, 6,090,543, and 7,482,127; International Publication Nos. WO 97/27214 and WO 98/42873; Lyamichev et al., Nat. Biotech., 17:292 (1999); and Hall et al., PNAS, USA, 97:8272 (2000)). Probes of a defined sequence can be produced by techniques known to those of ordinary skill in the art, such as by chemical synthesis, and by in vitro or in vivo expression from recombinant nucleic acid molecules.

A "primer" as used herein refers to an oligomer that hybridizes to a template nucleic acid and has a 3' end that is extended by polymerization. A primer can be optionally modified, by, for example, including a 5' region that is non-complementary to the target sequence. Such modification can include functional additions, such as tags, promoters, or other sequences that may be used or useful for manipulating or amplifying the primer or target oligonucleotide. Examples of primers incorporating tags, or tags and promoter sequences, are described in U.S. Pat. No. 9,284,549. A primer modified with a 5' promoter sequence can be referred to as a "promoter-primer." A person of ordinary skill in the art of molecular biology or biochemistry will understand that an oligomer that can function as a primer can be modified to include a 5' promoter sequence and then function as a promoter-primer, and, similarly, any promoter-primer can serve as a primer with or without its 5' promoter sequence.

An "oligomer" or "oligonucleotide" as used herein refers to a nucleic acid of generally less than 1,000 nucleotides (nt), including those in a size range having a lower limit of about 2 to 5 nt and an upper limit of about 500 to 900 nt. Some particular embodiments are oligomers in a size range with a lower limit of about 5 to 15, 16, 17, 18, 19, or 20 nt and an upper limit of about 50 to 600 nt, and other particular embodiments are in a size range with a lower limit of about 10 to 20 nt and an upper limit of about 22 to 100 nt. Oligomers can be purified from naturally occurring sources, but can be synthesized by using any well-known enzymatic or chemical method. Oligomers can be referred to by a functional name (e.g., capture probe, primer or promoter primer) but those skilled in the art will understand that such terms refer to oligomers. Oligomers can form secondary and tertiary structures by self-hybridizing or by hybridizing to other polynucleotides. Such structures can include, but are not limited to, duplexes, hairpins, cruciforms, bends, and triplexes. Oligomers may be generated in any manner, including chemical synthesis, DNA replication, reverse transcription, PCR, or a combination thereof. In some embodiments, oligomers that form invasive cleavage structures are generated in a reaction (e.g., by extension of a primer in an enzymatic extension reaction).

"Nucleic acid amplification" or simply "amplification" as used herein refers to any in vitro procedure that produces multiple copies of a target nucleic acid sequence, or its complementary sequence, or fragments thereof (i.e., an amplified sequence containing less than the complete target nucleic acid). Amplification methods include, for example, replicase-mediated amplification, polymerase chain reaction (PCR), ligase chain reaction (LCR), strand-displacement amplification (SDA), helicase-dependent amplification (HDA), transcription-mediated amplification (TMA), and nucleic acid sequence-based amplification (NASBA). TMA and NASBA are both forms of transcription-based amplification. Replicase-mediated amplification uses self-replicating RNA molecules, and a replicase such as QB-replicase (see, e.g., U.S. Pat. No. 4,786,600). PCR uses a DNA polymerase, pairs of primers, and thermal cycling to synthesize multiple copies of two complementary strands of dsDNA or from a cDNA (sec, e.g., U.S. Pat. Nos. 4,683,195, 4,683,202, and 4,800,159). LCR uses four or more different oligonucleotides to amplify a target and its complementary strand by using multiple cycles of hybridization, ligation, and denaturation (see, e.g., U.S. Pat. Nos. 5,427,930 and 5,516,663). SDA uses a primer that contains a recognition site for a restriction endonuclease and an endonuclease that nicks one strand of a hemimodified DNA duplex that includes the target sequence, whereby amplification occurs in a series of primer extension and strand displacement steps (see, e.g., U.S. Pat. Nos. 5,422,252, 5,547,861, and 5,648,211). HDA uses a helicase to separate the two strands of a DNA duplex generating single-stranded templates, followed by hybridization of sequence-specific primers hybridize to the templates and extension by DNA polymerase to amplify the target sequence (see, e.g., U.S. Pat. No. 7,282,328). Transcription-based amplification uses a DNA polymerase, an RNA polymerase, deoxyribonucleoside triphosphates, ribonucleoside triphosphates, a promoter-containing oligonucleotide, and optionally can include other oligonucleotides, to ultimately produce multiple RNA transcripts from a nucleic acid template. Examples of transcription-based amplification are described in U.S. Pat. Nos. 4,868,105, 5,124,990, 5,130,238, 5,399,491, 5,409,818, and 5,554,516; and in International Publication Nos. WO 88/01302, WO 88/10315 and WO 95/03430. Amplification may be either linear or exponential.

A "Lab Developed Test" or "LDT" as used herein refers to an assay designed, validated and used by a laboratory, where kits or devices for performing the assay are not commercially marketed or sold as a product for use by other laboratories.

An "assay" as used herein refers to a procedure for detecting and/or quantifying an analyte in a sample. A sample comprising or suspected of comprising the analyte is contacted with one or more reagents and subjected to conditions permissive for generating a detectable signal informative of whether the analyte is present or the amount (e.g., mass or concentration) of analyte in the sample.

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, inside, outside, inner, outer, proximal, distal, in front of, behind, next to, adjacent, between, horizontal, vertical, diagonal, longitudinal, transverse, etc., are used for convenience in referring to such component, apparatus, location, feature, or a portion thereof in the drawings and are not intended to be limiting. Further, relative terms such as, for example, "about," "substantially," "approximately," etc., are used to indicate a possible variation of ±10% in a stated numeric value or range.

Figure 4:
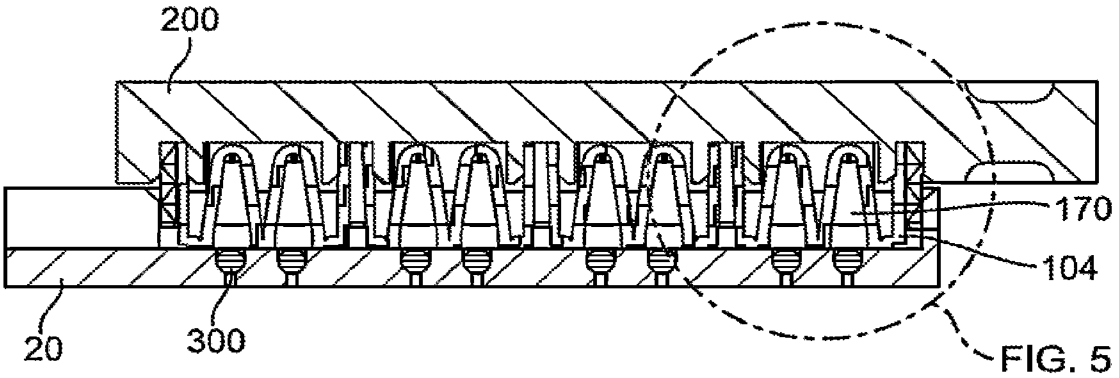
FIG. 4 is a cross-sectional view of the system taken along line 4-4 of FIG. 2.
Figure 5:
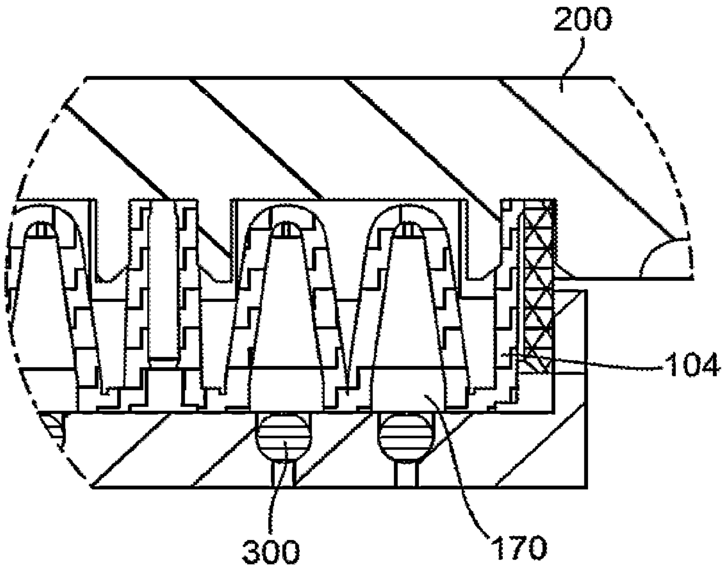
FIG. 5 is an enlargement of FIG. 4.
Figure 7:
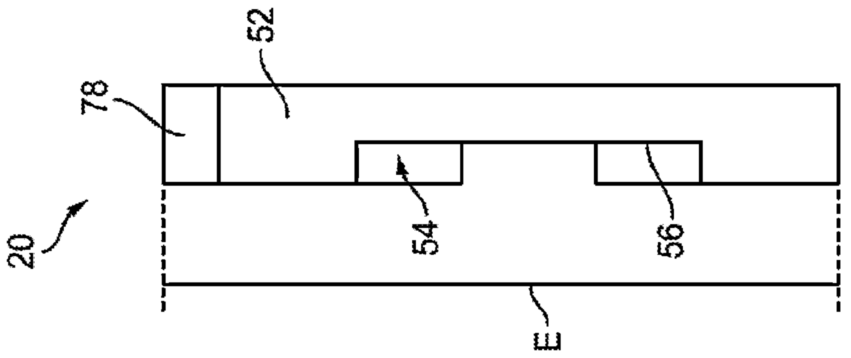
FIG. 7 side view of the tray of FIG. 1.
Figure 6:
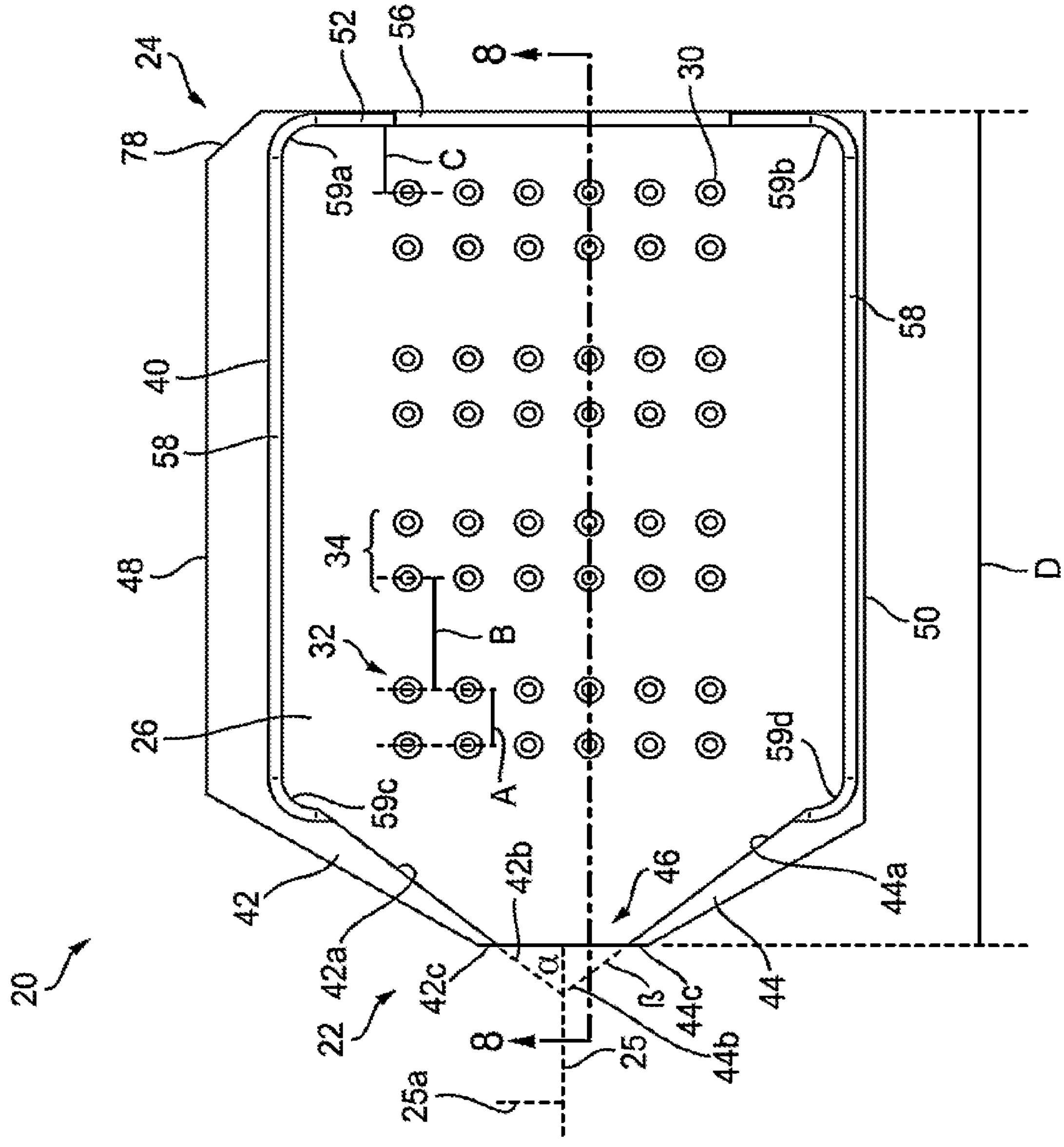
FIG. 6 is a top view of an exemplary tray from the system of FIG. 1.

Embodiments of the present disclosure relate to systems and methods for transferring solid reagents 300 (referring to FIGS. 4 and 5) (e.g., lyophilized reagents) to wells of one or more cartridge, where the reagents may be reconstituted with a reconstitution solution. The reconstituted reagents may be transferred to vials for performing assays, such as amplification reactions. Solid reagents 300 may include, for example, one or more of Taq DNA polymerase, dNTPs, $MgCl_2$, and reaction buffers, at optimal concentrations for efficient amplification of DNA templates. In some embodiments, solid reagents 300 also may include the probes and/or primers for needed for performing a PCR or other nucleic acid amplification reaction. In some embodiments, solid reagents 300 intended for use with a Lab Developed Test (LDT) may not include probes or primers. It is further contemplated that solid reagents 300 may alternatively include suitable reagents, components, or the like, used to facilitate any other reaction that can be performed in an automated analyzer. Solid reagent 300 may be clear, translucent, and/or may include shades of white, gray, yellow, and/or other colors.

A system 10 for transferring solid reagents 300 to one or more multi-well receptacles (e.g., cartridges) is shown in FIGS. 1-5. In particular, system 10 may include a tray 20, a cartridge assembly 100 (including cartridges 104), and a press plate 200 that align with one another to facilitate the transfer of solid reagents 300 from tray 20 to various wells in each cartridge 104.

Figure 8:
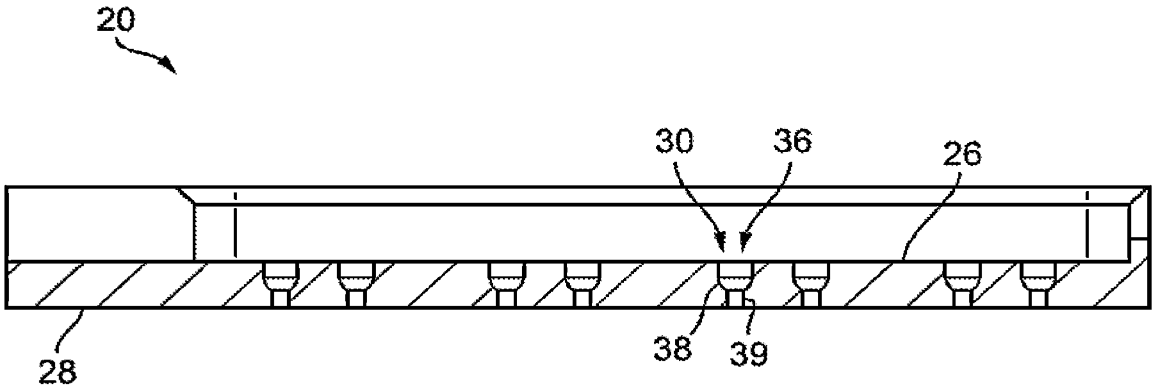
FIG. 8 is a cross-sectional view of the tray taken along line 8-8 of FIG. 6.
Figure 9:
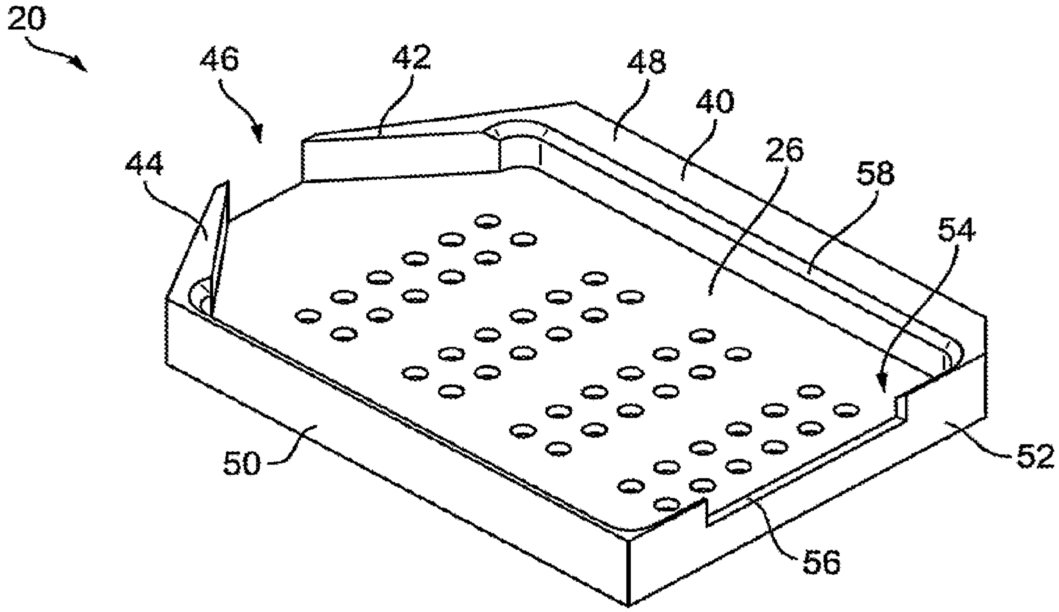
FIG. 9 is a perspective view of the tray of FIG. 6.

Referring to FIGS. 6-9, tray 20 may extend from a first end 22 toward a second end 24, along a longitudinal axis 25. Tray 20 also may include a top surface 26 having a plurality of depressions 30 formed therein, and a bottom surface 28 that may be substantially parallel to top surface 26. Depressions 30 may be arranged in a plurality of rows 32 that extend substantially perpendicular to longitudinal axis 25, and along an axis 25*a*. Furthermore, one or more pairs of rows 34 may be arranged on tray 20. The dimensions referred to herein are exemplary only, and illustrate only some embodiments encompassed by the present disclosure. In one embodiment, the distance between a center of a depression 30 from a first row of a pair of rows 34 to a depression 30 in a second row of the same pair of rows 34 (dimension "A" in FIG. 6) is about 9.00 mm, and the distance between the centers of adjacent depressions 30 from the same row also is about 9.00 mm. In one embodiment, the distance between the center of a depression 30 of one pair of rows 34 to the center of a closest depression 30 in a closest adjacent row (dimension "B") is about 18.0 mm. The distance from second end 24 of tray 20 (measured from inside end wall portion 52) to a center of a depression 30 in a closest row (dimension "C") is about 13.30 mm. Each dimension "A," "B," and "C" is measured along an axis that is substantially parallel to longitudinal axis 25. Each pair of rows 34 may correspond to wells 170 of a cartridge 104 (see FIG. 10), as explained in further detail below. In the embodiment shown, four pairs of rows 34 are shown on tray 20, such that tray 20 can simultaneously load or transfer solid reagents 300 from depressions 30 into four cartridges 104. However, it is contemplated that tray 20 may include any other suitable number of pairs of rows 34, such as, for example, 2, 3, 5, 6, or more. Each pair of rows 34 may correspond to rows of wells 170 from a single cartridge 104. As best seen in FIG. 8, each depression 30 includes an opening 36 in top surface 26, and an open bottom 38 disposed between top surface 26 and bottom surface 28. Open bottom 38 may be coupled to a conduit 39 that extends through bottom surface 28. Open bottom 38 may by hemispherical in shape, or may have another suitable shape, such as, for example, conical or the like. Conduit 39 may be cylindrical in shape, or may have another suitable shape. Conduits 39 may have a smaller diameter than openings 36. In an exemplary embodiment, openings 36 of depressions 30 may have a radius of about 4.10 mm, and conduits 39 may have a radius of about 2.00 mm. Conduits 39 help enable cleaning of tray 20. For example, water may be able to drain through conduits 39 during cleaning. Conduits 39 also may provide a window through which a user can visually confirm that depression 30 is emptied of solid reagents 300.

Figure 14:
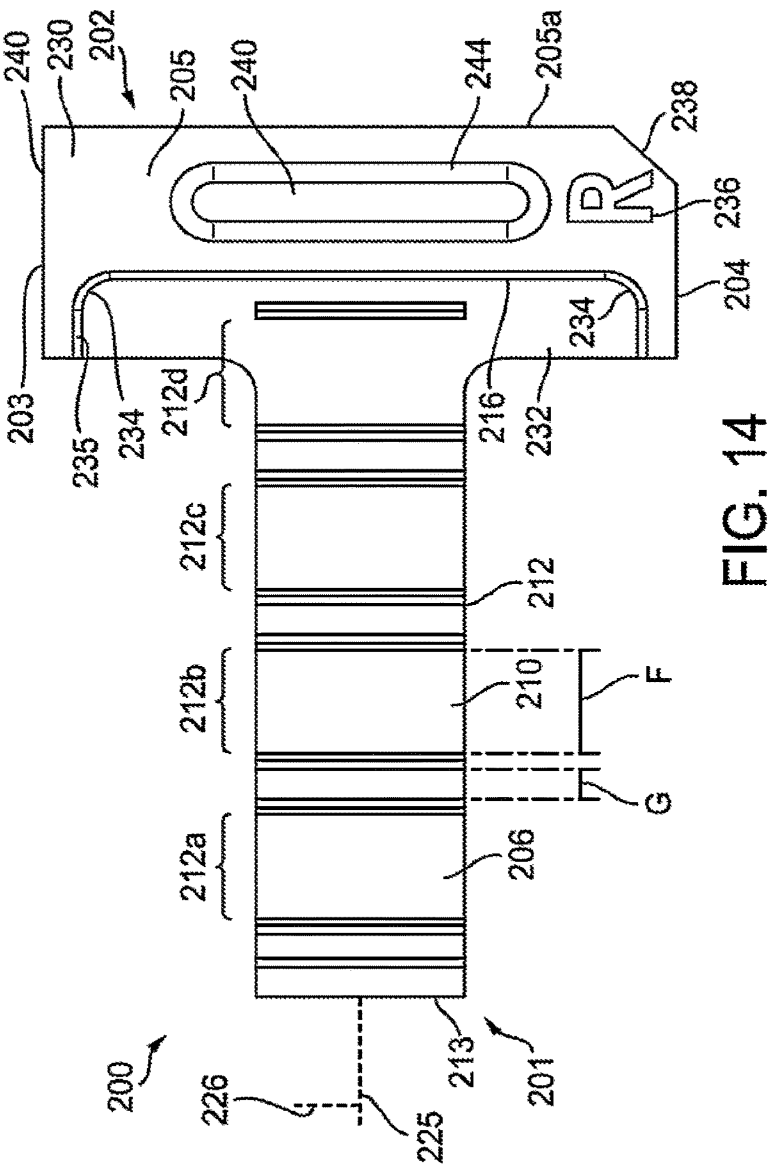
FIG. 14 is a top view of a press plate from the system of FIG. 1.
Figure 15:
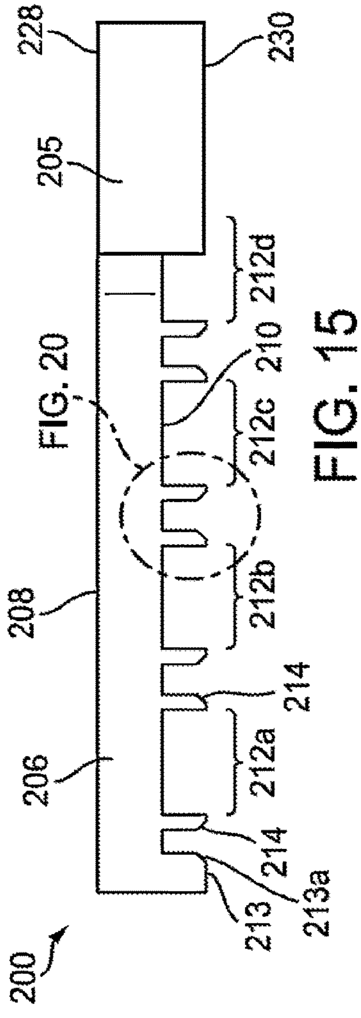
FIG. 15 is a side view of the press plate from FIG. 14.
Figure 17:
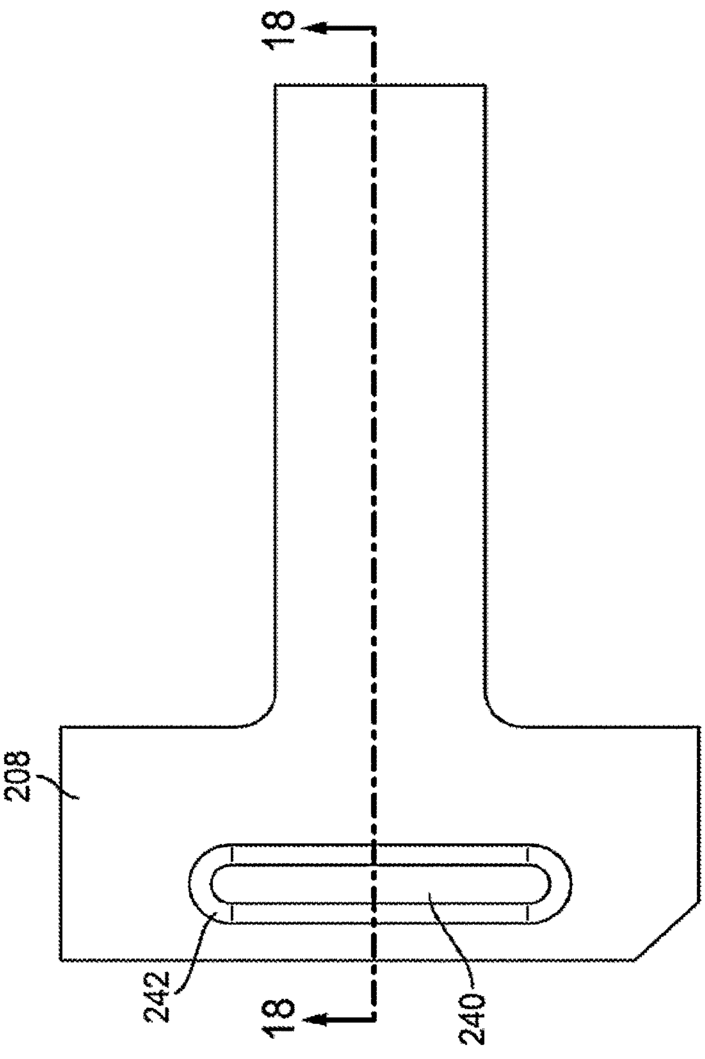
FIG. 17 is a bottom view of the press plate from FIG. 14.
Figure 18:
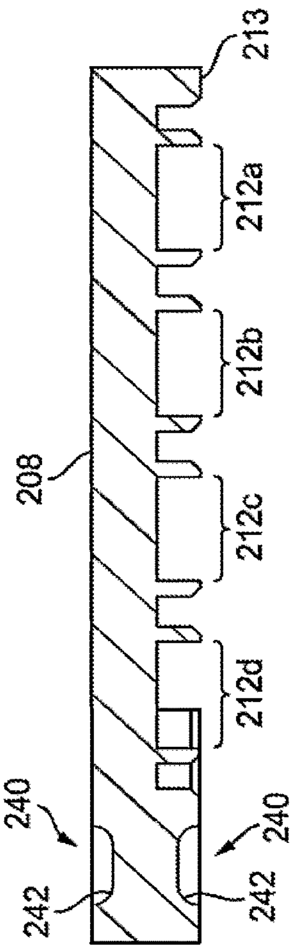
FIG. 18. is a cross-sectional view taken along line 18-18 of FIG. 17.
Figure 20:
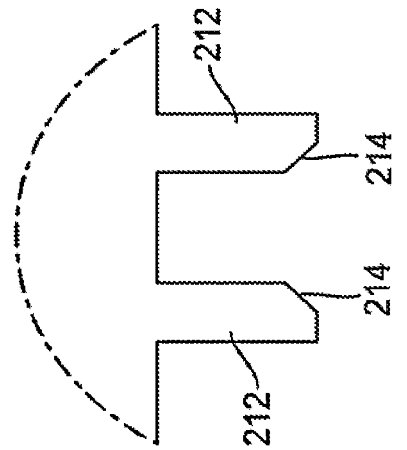
FIG. 20 is an enlargement of a portion of FIG. 18.
Figure 19:
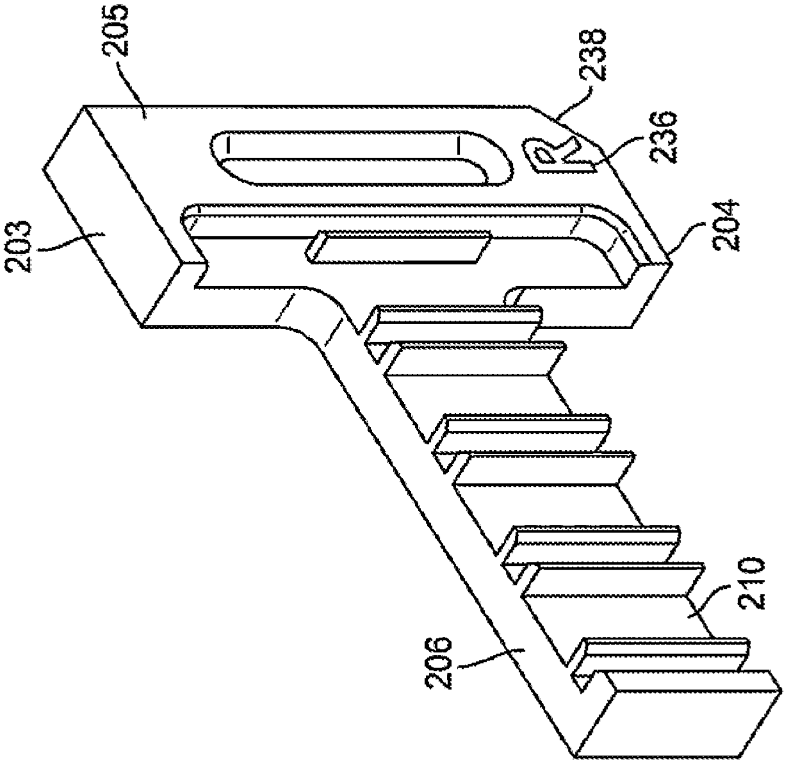
FIG. 19 is a perspective view of the press plate from FIG. 14.

A barrier wall 40 may project above top surface 26, and may substantially surround top surface 26. In one embodiment, barrier wall 40 may extend about top surface 26 by about 9.50 mm, although any other suitable distance also is contemplated. Barrier wall 40 may be discontinuous at first end 22. In particular, barrier wall 40 may include a first end wall portion 42 and a second end wall portion 44 that are opposed to and arranged obliquely relative to each other. First end wall portion 42 and second end wall portion 44 may define an opening 46 in barrier wall 40 for removing excess solid reagents 300 from tray 20. In particular, an end **42*c* of first end wall portion 42, and an end 44*c* of second end wall portion 44, may define opening 46. In other words, opening 46 may not be fully enclosed. Opening 46 may have a width of about 19.00 mm along axis 25*a*, and may be spaced about 136.00 mm from second end 24 (dimension “D” in FIG. 6). Axes 25 and 25*a* may be substantially perpendicular to each other. First end wall portion 42 and second end wall portion 44 may be mirror images of each other about longitudinal axis 25 of tray 26 in some embodiments. However, it is contemplated that first end wall portion 42 and second end wall portion 44 may be different than one another. For example, first end wall portion 42 and second end wall portion 44 may have different thicknesses, heights, and/or may be offset from longitudinal axis 25 at different angles. First end wall portion 42 may be offset from longitudinal axis 25 by an angle $\alpha$, and second end wall portion 44 may be offset from longitudinal axis 25 by an angle $\beta$. That is, a projection 42*b* of a plane along which inner surface 42*a* extends, may intersect longitudinal axis 25 and form angle $\alpha$. A projection 44*b* along which an inner surface 44*a* of second end wall portion 44 extends, also may intersect longitudinal axis 25, and form angle $\beta$. In some embodiments, angle $\alpha$ may be from about 35 to about 65 degrees, from about 45 to about 55 degrees, from about 48 to about 52 degrees, about 49 degrees, about 50 degrees, or about 51 degrees. Angle $\beta$ may be substantially identical to angle $\alpha$, or may have a different value than angle $\alpha$. Barrier wall 40 may also include a third end wall portion 52 at second end 24. Third end wall portion 52 may be substantially perpendicular to longitudinal axis 25, and may extend along axis 25*a*. Third end wall portion 52 may include a cutout 54 extending partially along a middle of third end wall portion 52. In some embodiments, cutout 54 may receive a correspondingly shaped mated feature (such as a protrusion, not shown) of press plate 200 or another press plate. The mated feature may extend into cutout 54 when press plate 200 and tray 20 are properly aligned. A surface 56 defining a bottom of cutout 54 is situated above top surface 26. Cutout 54 may be about 6.50 mm deep and about 50.00 mm long. In some embodiments, cutout 54 may be omitted. Barrier wall 40 may also include a first sidewall portion 48 contiguous with first end wall portion 42, and at an opposite end contiguous with third end wall portion 52. Barrier wall 40 also may include an opposing second sidewall portion 50 contiguous with second end wall portion 44, and at an opposite end contiguous with third end wall portion 52. First sidewall portion 48 and second sidewall portion 50 may each extend substantially parallel to longitudinal axis 25 of tray 20. In one embodiment, the distance between an outer surface of first sidewall portion 48 and an outer surface of second sidewall portion 50 may be about 98.00 mm (dimension “E” in FIG. 6). First sidewall portion 48 may be thicker than second sidewall portion 50, and first sidewall portion 48 may include an angled end surface 78. The larger thickness of first sidewall portion 48 and the presence of angled end surface 78 may facilitate alignment of tray 20 with other components of system 10, including for example, an angled end surface 238 of press plate 200 (referring to FIG. 14). Angled end surface 78 may be formed by a 45 degree corner disposed between first sidewall portion 48 and third end wall portion 52. The corner angle could be any other suitable angle between about 20 and 70 degrees sufficient to enable an operator to quickly visualize a difference between angled end surface 78 and the transition between second sidewall portion 50 and third end wall portion 52** (which intersect to form a 90 degree angle).

Barrier wall 40 may also include one or more rounded interior portions, such as, for example, rounded portions **59*a*, 59*b*, 59*c*, and 59*d*, that face radially inwardly from the periphery of barrier wall 40. Rounded portion 59*a* may be disposed at an intersection of first side wall portion 48 and third end wall portion 52. Rounded portion 59*b* may be disposed at an intersection of second side wall portion 50 and third end wall portion 52. Rounded portion 59*c* may be disposed at an intersection of first side wall portion 48 and first end wall portion 42. Rounded portion 59*d* may be disposed at an intersection of second side wall portion 50 and second end wall portion 44. Each rounded portion 59*a*-59*d*** may include an arc of about 90 degrees, and a radius of about 5 mm, although other suitable values are also contemplated.

A top of barrier wall 40 may include a 45 degree chamfer 58, although other suitable dimensions for chamfer 58 are contemplated. Chamfer 58 may extend around a portion of barrier wall 40, for example, along inner portions of rounded portions **59*a-d*, first side wall portion 48, second sidewall portion 50, and partially along end wall portion 52 (cutout 54 may not include a chamfer). In other embodiments, chamfer 58 may extend along the inner portions of an entirety of barrier wall 40, although other designs also are contemplated. Chamfer 58 may assist an operator with aligning cartridge assembly 100 with tray 20, and may guide cartridge assembly 100 into tray 20**.

Tray 20 may be formed from any suitable material. In at least one embodiment, tray 20 is formed from aluminum, but any other metal, alloy, or plastic also may be utilized. One or more surfaces of tray 20 may be magnetized or include a magnetic material, including, for example top surface 26. Magnets also may be placed at various locations, to facilitate alignment with one or more other components of system 10, and/or to help secure the aligned components together during transfer of solid reagents 300. Furthermore, tray 20 may include a dark, anodized finish, to facilitate visual inspection and alignment of tray 20 relative to other components of system 10 (e.g., press plate 200 and cartridge assembly 100). In one embodiment, the dark, anodized finish, may be black, although other colors also are contemplated, such as, for example, white, gray, navy, or the like. The color of top surface 26 may contrast with a color of solid reagents 300 (e.g., clear, white, gray, yellow, or another light color) deposited into each depression 30.

Figure 10:
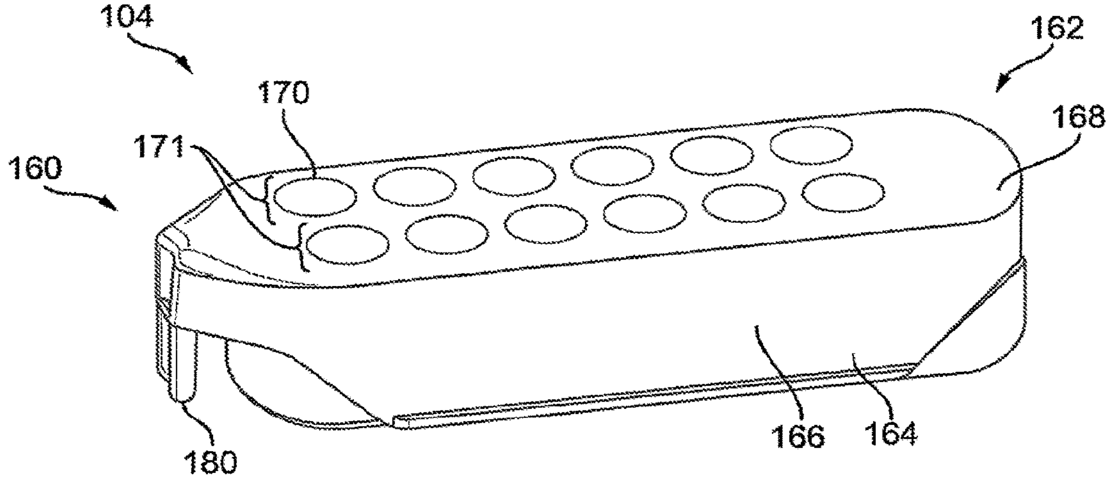
FIG. 10 is a perspective top view of an exemplary cartridge from the system of FIG. 1.
Figure 11:
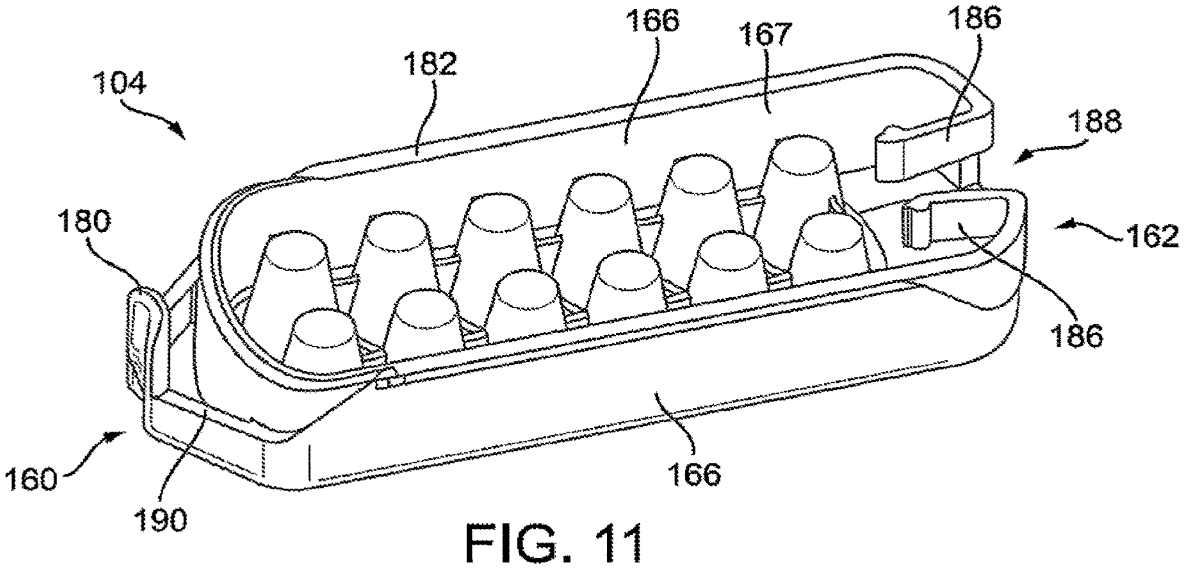
FIG. 11 is a perspective bottom view of the cartridge of FIG. 10.

Referring to FIGS. 10 and 11, each cartridge 104 may extend from a first end 160 toward a second end 162. Cartridge 104 also may have a base 164 having sidewalls 166, and a top surface 168. In particular, base 164 may have two opposed sidewalls 166 extending from first end 160 toward second end 162. The two opposed sidewalls 166 may extend substantially parallel to each other, and may depend from top surface 168. A plurality of wells 170 may have openings disposed in top surface 168, and each of the wells 170 may extend downward from top surface 168. Wells 170 may be arranged in one or more rows 171 (e.g., two, three or more parallel rows). Cartridge 104 also may include an arm 180 configured for engagement with a transport mechanism, such as a rotary distributor (not shown) for transport within an automated analyzer. An exemplary rotary distributor can be found in U.S. Pat. No. 9,732,374. A bottom surface 182 of base 164 may be formed with one or more snap fingers 186, which define a slot 188 into which an element (not shown) of the analyzer is inserted. An exemplary element for engagement with the slot is illustrated in the '374 patent. Thus, snap fingers 186 may grasp the element of the analyzer, thereby forming a secure attachment. Each cartridge 104 may be formed from plastic, such as, for example, a transparent plastic. At first end 160, cartridge 104 also may include a ridge 190 disposed between top surface 168 and bottom surface 182. Ridge 190 may connect base 164 with arm 180.

Figure 12:
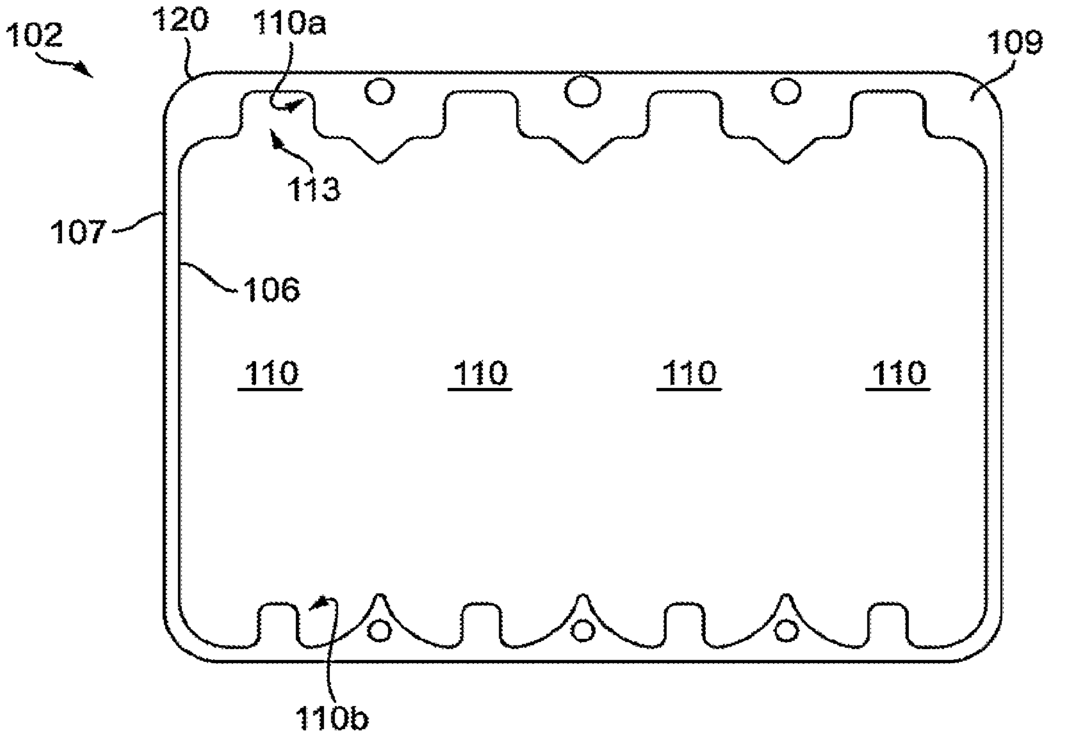
FIG. 12 is a bottom view of a cartridge holder from the system of FIG. 1.
Figure 13:
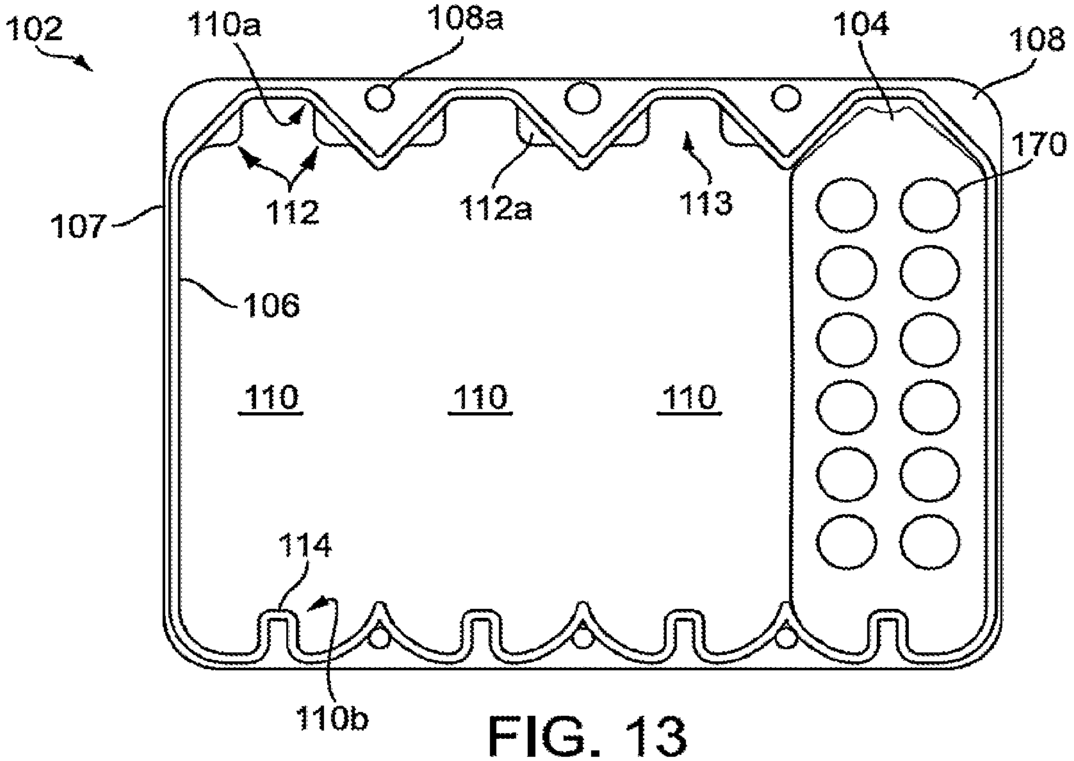
FIG. 13 is a top view of the cartridge holder of FIG. 12.
Figure 16:
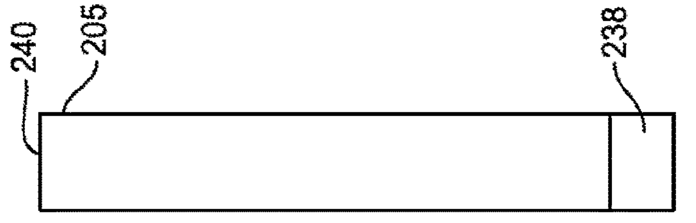
FIG. 16 is an end view of the press plate from FIG. 14.

Referring to FIGS. 12 and 13, cartridge ring 102 may include an inner surface 106 and an outer surface 107. Cartridge ring 102 also may include a top surface 108 and a bottom surface 109 that may be generally parallel to top surface 108. Inner surface 106 may define one or more slots 110. Each slot 110 may have a first end 110*a* and a second end 110*b* for supporting first and second ends 160, 162, of a given cartridge 104. First end 110*a* of each slot 110 may include a pair of spaced apart protrusions 112 configured to support first end 160 of cartridge 104. Protrusions 112 may extend from inner surface 106 such that a receiving surface 112*a* of protrusion 112 is disposed between top surface 108 and bottom surface 109. Receiving surface 112*a* may directly contact ridge 190 of cartridge 104 when cartridge 104 is inserted into cartridge ring 102. A gap 113 may be disposed between protrusions 112. Gap 113 may be configured to receive arm 180 of cartridge 104 as cartridge 104 is inserted into slot 110. Cartridge ring 102 also may include a protrusion 114 at second end 110*b*. A portion of protrusion 114 at top surface 108 may support second end 162 of cartridge 104 after cartridge 104 is inserted into slot 110. Protrusion 114 may be positioned within slot 110 such that protrusion 114 is received between snap fingers 186 of a respective cartridge 104. Cartridge ring 102 also may include one or more (e.g., two, three, four, or more) rounded corners 120 on its outer surface that may be received by rounded corners 59*a*-59*d* of tray 20. In one embodiment, cartridge ring 104 may include exactly four rounded corners 120.

In one embodiment, cartridge ring 102 may be formed from metal, although other suitable materials, such as, for example, plastic also are contemplated. In some embodiments, one or more portions of top surface 108 of cartridge ring 102 may be magnetized. In some embodiments, top surface 108 may include one or more magnets 108*a*. In one embodiment, magnets 108 may be produced by K&J Magnetics, model D24-N52, having a 0.125 inch diameter and 0.25 inch thickness.

Referring to FIGS. 14-18, press plate 200 may extend from a first end 201 toward a second end 202. A central longitudinal axis 225 may extend from first end 201 toward second end 202, and press plate 200 may include a first side 203 and a second side 204 positioned on opposite sides of central longitudinal axis 225. First side 203 and second side 204 may have one or more different features or shapes to facilitate the alignment of press plate 200 with other components of system 10. Each of first side 203 and second side 204 may extend from first end 201 toward second end 202. A handle member 205 may be disposed at second end 202. A receiving member 206 having a flat bottom surface 208 and a top surface 210 may extend from first end 201 toward handle member 205 at second end 204. Top surface 210 may include a plurality of ridges 212 arranged in pairs 212*a*, 212*b*, and 212*c* of parallel ridges 212. A fourth pair of ridges 212*d* may span both receiving member 206 and handle member 205 (e.g., one ridge 212 may be disposed on receiving member 206 and another ridge 212 may be disposed on handle member 205). Each pair of ridges 212 may have chamfers 214 that face away from each other. Chamfers 214 may be configured to interact with sidewalls 166 of cartridge 104, and may extend at an angle of about 45 degrees from a top surface of its associated ridge 212. Ridges 212 of a given pair of ridges are spaced apart so as to contact inner surfaces 167 of opposed sidewalls 166 of a same cartridge 104. Contact between ridges 212 and inner surfaces 167 is established as cartridge 104 is pressed onto press plate 200. This initial contact between ridges 212 and a cartridge 104 is between the tops of ridges 212 (chamfers 214) and bottoms of sidewalls 166 of a same cartridge. As will be described in further detail below with respect to FIGS. 21A-B, multiple cartridges 104 may be loaded into a cartridge ring 102, and then subsequently engaged with a respective pair of ridges 212, to ultimately form a frictional fit with press plate 200.

Furthermore, ridges 212 may be spaced relative to each other, so that a first ridge of pair 212*a* is disposed closer to an end wall 213 (having a chamfer 213*a*) than to a second ridge of pair 212*a*. The second ridge of pair 212*a* may be disposed closer to a first ridge of pair 212*b* than to the first ridge of pair 212*a*. The first ridge of pair 212*b* may be disposed closer to the second ridge of pair 212*a* than to a second ridge of pair 212*b*. The second ridge of pair 212*b* may be disposed closer to a first ridge of pair 212*c* than to the first ridge of pair 212*b*. The first ridge of pair 212*c* may be disposed closer to the second ridge of pair 212*b* than to a second ridge of pair 212*c*. The second ridge of pair 212*c* may be closer to a first ridge of pair 212*d* than to the first ridge of pair 212*c*. The first ridge of pair 212*d* may be disposed closer to the second ridge of pair 212*c* than to a second ridge of pair 212*d*. The second ridge of pair 212*d* may be disposed closer to a wall 216 than to the first ridge of pair 212*d*.

Each ridge 212 may extend upward from top surface 210 by about 0.25 inches, although any other suitable value may be contemplated, such as, for example, from about 0.05 inches to about 1.00 inch. Each ridge 212 may have a thickness (along longitudinal axis 225) of about 0.10 inches, from about 0.05 inches to about 0.30 inches, or more than 0.05 inches. Each ridge 212 may have the same height and/or thickness as any other ridge 212, or there may be some variation between ridges with respect to height and thickness. Inside edges of a given pair of ridges 212 may be spaced from each other by about 0.677 inches (dimension "F" of FIG. 14). Outside edges of the closest ridges of adjacent pairs of ridges 212 may be spaced from each other by about 0.188 inches (dimension "G" in FIG. 14) (e.g., the second ridge of pair 212*a* and the first ridge of pair 212*b*, the second ridge of pair 212*b* and the first ridge of pair 212*c*, and the second ridge of pair 212*c* and the first ridge of pair 212*d*). An inside edge of wall 216 and an outer edge of the second ridge of pair 212*d* may be spaced from each other by about 0.150 inches. An inside edge of end wall 213 and an outside edge of the first ridge of pair 212*a* may be spaced from each other by about 0.150 inches. End wall 213 may extend upward from top surface 210 by about 0.25 inches, or a by substantially similar amount as each ridge 212. End wall 213 also may extend along longitudinal axis 225 by about 0.25 inches. Raised wall 216 also may extend upward from top surface 210 by about 0.25 inches. Each ridge may have a length of about 1.250 inches along axis 226, which is perpendicular to axis 225. A chamfer 235 may extend along an entirety of raised wall 216 at an angle of about 45 degrees from top surface 230 of handle member 205.

Handle member 205 may include a bottom surface 228 that is substantially co-planar with bottom surface 208 of receiving member 206, and a top surface 230 that is substantially parallel to and offset from top surface 210 of receiving member 206. Handle member 205 may include a recessed portion 232 that is substantially co-planar with top surface 210 of receiving member 206. Fourth pair 212*d* of ridges 212 may span both top surface 210 and recessed portion 232 (i.e., the first ridge of pair 212*d* extending upward from top surface 210 and the second ridge of pair 212*d* extending upward from recessed portion 232). Handle member 205 may include rounded portions 234 that are configured to receive rounded portions 120 of cartridge ring 102. Handle member 205, on at least one of first side 203 or second side 204, may include at least one of a symbol 236 and an angled end surface 238. In some embodiments, only first side 203 or second side 204 include symbols 236 and/or angled end surface 238. Angled end surface 238 may be formed by, for example, a 45 degree corner disposed between second side 204 and an end wall 205*a* at second end 202. The angled end surface 238 may be any other suitable angle between about 20 and 70 degrees sufficient to enable an operator to quickly visualize a difference between angled end surface 238 and end surface 240 (which is characterized by a 90 degree intersection of first side 203 and end wall 205). In the embodiment shown in FIGS. 14-18, second side 204 includes angled end surface 238, and first side 203 includes end surface 240 having the 90 degree intersection. Symbol 236 may be any suitable symbol, such as, for example, a letter and/or number, or other suitable symbol. In the embodiment depicted, symbol 236 is an "R." The "R" may indicate to an operator that during at least some portion of the transfer procedure, the "R" should be on a user's "right" side. Symbol 236 may be etched, printed, stamped, or placed on to top surface 230 of handle member 205 in any other suitable manner. Handle member 205 also may define, for example, an opening or oval-shaped grooves 240. If grooves, then one groove 240 of an opposed pair of grooves may be disposed in bottom surface 228, and the other groove 240 may be disposed in top surface 230. It is contemplated that groove 240 may have any other suitable shape. Each groove 240 may include a rounded portion 242 that surrounds all or a portion of groove 240, and faces radially inwardly from the periphery of a respective groove 240. Rounded portion 242 may include an arc of about 90 degrees, and a radius of about 0.125 inches, although other suitable values are also contemplated. Groove 240 may have a larger dimension along axis 226 than each ridge 212, and may extend along axis 225 about 0.25 inches. Grooves 240 may facilitate gripping of handle member 205, and may be relatively shallow to facilitate cleaning.

Figure 21A:
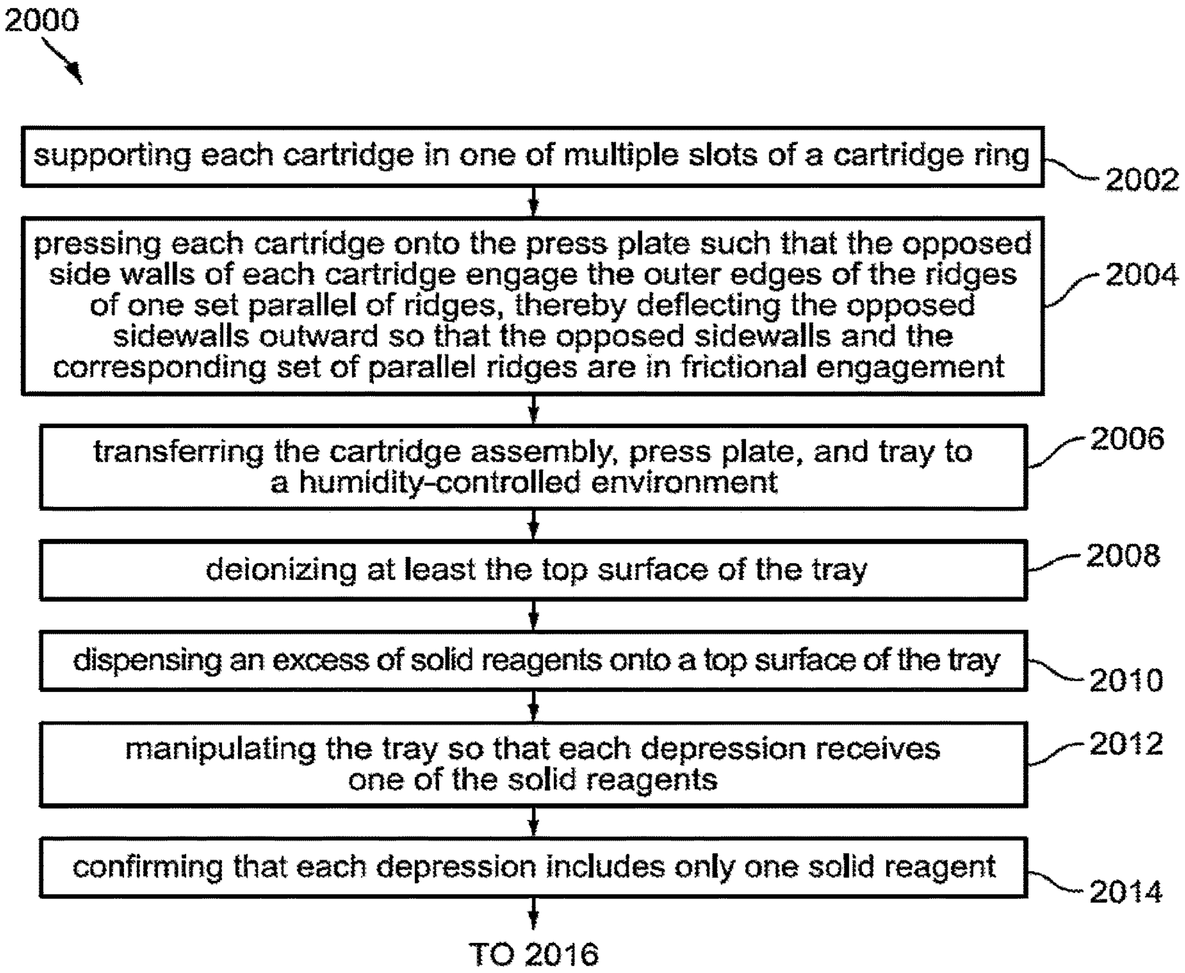
FIGS. 21A-B depict a flowchart showing an exemplary method of the present disclosure.
Figure 21B:
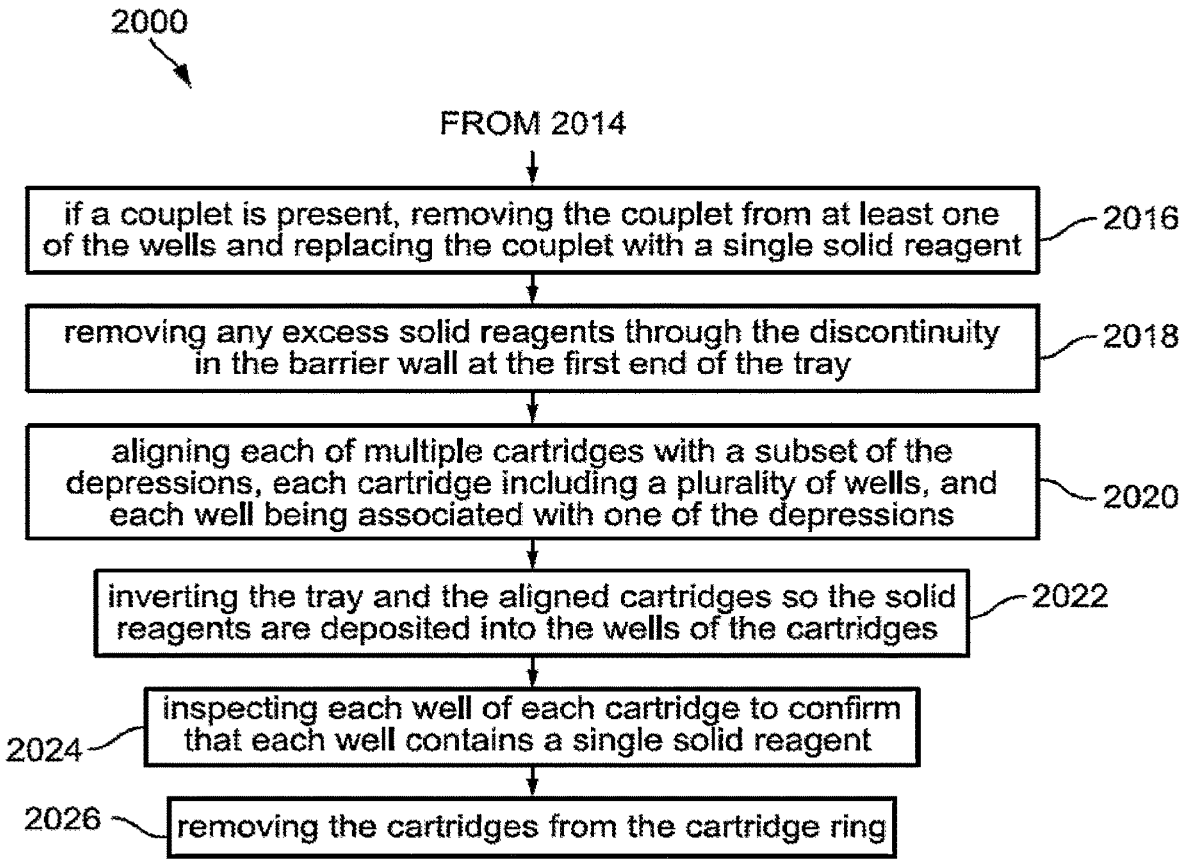

A method for loading wells 170 of cartridges 104 with solid reagents 300 will now be discussed. Referring to FIGS. 21A-B, a method 2000 is shown. Method 2000 may begin at step 2002, where a cartridge ring 102 is loaded with empty cartridges 104. In the embodiments shown in the figures, four cartridges 104 are loaded onto a single cartridge ring 102, but other numbers also are contemplated. Cartridges 104 may be loaded while top surface 108 of cartridge ring 102 faces the user. Cartridges 104 may loaded onto cartridge ring 102 so that first end 160 of each cartridge 104 is disposed at first end 110*a* of a slot 110, and so that second end 162 of each cartridge is disposed at second 110*b* of a slot 110 as set forth above. After loading cartridges 104 onto cartridge ring 102, top surfaces 168 of cartridges 104 may be substantially flush with to top surface 108 of cartridge ring 108 (than to bottom surface 109), and bottom surface 182 of cartridges 104 may be substantially flush with bottom surface 109 of cartridge ring 102 (than to top surface 108).

The dimensioning of adjacent slots 110 in cartridge ring 102 may help ensure appropriate spacing of cartridges 104 to align with ridges 212 of press plate 200. Thus, method 2000 may proceed to step 2004, where press plate 200 is coupled to cartridge assembly 100 (containing cartridge ring 102 and cartridges 104) by pressing each cartridge 104 onto press plate 200 such that the opposed side walls 166 of each cartridge 104 engage outer edges of ridges 212 of one set of parallel of ridges, thereby deflecting sidewalls 166 outward so that opposed sidewalls 166 and the corresponding set of parallel ridges 212 are in frictional engagement. Alternatively, ridges 212 may be deflected inward, or both sidewalls 166 and ridges 212 may be deflected. Chamfers 214 may help enable side walls 166 to slide relative to the outer edges of ridges 212 (instead of getting caught on the top surface of the ridges). In one embodiment, a user may rest press plate 200 on a flat surface with top surface 230 facing upward toward the user. In this embodiment, the user may position cartridge assembly 100 so that the openings of wells 170 face the user and bottom surface 109 of cartridge ring 102 faces downward, away from the user (toward press plate 200). In this orientation, cartridge assembly 100 may be snapped onto press plate 200 so that each ridge 212 of press plate 200 engages with one sidewall 166 of a cartridge 104. The distance between the outer surfaces of each set of ridges (212*a*, 212*b*, 212*c*, and 212*d*) is slightly greater than the distance between the inner surfaces of side walls 166 of a corresponding cartridge 104. This dimensioning causes ridges 212 to apply an outwardly directed tension force to side walls 166 to help maintain the engagement between press plate 200 and cartridge assembly 100.

With cartridge assembly 100 securely engaged with press plate 200, the combination is transferred to an environmentally controlled glove box, along with tray 20, at step 2006. The glove box may be any suitable container configured to enable the user to manipulate tray 20, cartridge assembly 100, press plate 200, and solid reagents 300 within a controlled environment. In some embodiments, humidity within the glove box may be set to 5%, although other suitable humidity levels also are contemplated. In some embodiments, a static eliminator or other anti-static device may be activated (i.e., deionizer) at any time that one or more parts of system 10 are handled inside the glove box, especially when solid reagents 300 are being manipulated. In particular, at least top surface 26 of tray 20 may be deionized (step 2008) prior to dispensing solid reagents 300 on tray 20. One exemplary glove box is the 890-THC Touch Screen, Automatically Controlled Atmosphere Isolator/Glove Box, manufactured by Plas-Labs, Inc. of Lansing, MI.

At step 2010, the user may pour solid reagents 300 from a container, such as, for example, a bottle or the like, onto top surface 26 of tray 20. In some embodiments, in order to increase a speed of the loading procedure, the user may pour an excess number of solid reagents 300 onto top surface 26, and manipulate or move tray 20 along multiple dimensions (e.g., tilt, rotate, shake, change the plane of tray 20) so that each depression 30 receives exactly one solid reagent 300 (step 2012). Method 2000 also may include a visual inspection step 2014 to confirm that each depression 30 contains a solid reagent 300. Step 2014 also contemplates checking the each depression includes only one solid reagent 300. While depressions 30 are sized to hold a single solid reagent 300, it is possible for couplets to form during the formation of the solid reagents 300 (e.g., when liquid reagents are dispensed into a cryogenic fluid to form solid reagents 300). A visual inspection is performed at step 2014 after the manipulation step 2012 to ensure that each well 170 has been provided with only one solid reagent 300 and that no well 170 contains a couplet (a couplet would double the amount of expected reagent for an assay). Couplets may be removed from a depression 30, and a new, single solid reagent 300 can be loaded into the now-empty depression 30 at step 2016. In another embodiment, one or more solid reagents 300 may be poured onto tray 20, and steps 2010-2014 can be repeated. Couplets can be removed with any suitable tool, such as, for example, a vacuum pick tool. One exemplary vacuum pick tool is an electric pen-sized small parts lifter with a rubber suction cup, such as an ESD safe VVP-200 vacuum pen used with an ESD safe TV-1000 Tweezer-Vac™ kit, both available from Virtual Industries, Inc. (Colorado Springs, CO). Devices that apply pressure are generally to be avoided when transferring fragile solid reagents 300, such as lyophilisates, as they have a tendency to break such solid reagents 300. It is contemplated that visual inspection step 2014 may occur simultaneously with step 2012 and/or after step 2012. Excess solid reagents 300 may be removed from tray 20 through opening 46 (by tilting tray 20 at step 2018), and may be collected in a container (not shown). More specifically, the user may tilt tray 20 toward first end 22 in such a way that solid reagents 300 are not removed from their corresponding depressions 30. The container may be the same container that stores solid reagents 300 prior to their use in method 2000.

Method 2000 may then proceed to step 2020, where the combined cartridge assembly 100 and press plate 200 may be inverted 180 degrees by a user (e.g., flipped upside down) and nested with tray 20 (now containing exactly one solid reagent 300 in each depression 30). A nested arrangement is shown in FIGS. 2-5. The user may visually confirm correct alignment, because both angled surface 78 of tray 20 and angled surface 238 of press plate 200 should be to the top and to the right from the user's perspective in the depicted embodiment. Other configurations also are contemplated. For example, angled surface 78 and angled surface 238 could be to the lower right, the top left, or the bottom left, from the user's perspective. Magnets on top surface 108 of cartridge ring 102 may help secure cartridge ring 102 (and thus cartridges 104) to tray 20 so that top surfaces 168 of cartridges 104 are flush with top surface 26 of tray 20. This mating may otherwise be achieved by manually gripping (or automatically gripping by robotics) tray 70 and cartridge assembly 100 during inversion. Each depression 30 of cartridges 104 is now aligned with one well 170 of tray 20. This entire assembly is then rotated approximately 180 degrees (or inverted at step 2022), so that solid reagents 300 drop from depressions 30 into the corresponding wells 170 of cartridges 104. Tray 20 may then be removed from cartridge assembly 100, and cartridges 104 may be inspected to ensure that each well 170 contains exactly one solid reagent 300 (step 2024).

After separating press plate 200 from cartridge assembly 100, cartridges 104, which are still supported by the cartridge ring 102 may be transferred to a sealer outside of the glove box for application of a frangible seal to cartridges 104. In one embodiment, the sealer may be a Thermo Scientific ALPS™ 3000 Microplate Heat Sealer.

The frangible seal may include a low water vapor transmission rate (MVTR) if solid reagent 300 is a lyophilized reagent, as unintended reconstitution of the reagent could affect long-term stability of the reagent. Exemplary seals are made by Thermo Fischer Scientific, Inc., and may include a polyester/foil/polypropylene laminate heat sealing foil (Ordering Numbers AB-0559, AB-0671, and AB-3559). After sealing cartridges 104, cartridge assembly 100 may be transferred to a cutter, which cuts the excess sealing material. In one embodiment, the cutter may be a Janesville Tool & Mfg. Base A-3235-OT (with custom trimming kit). Cartridges 104 may then be individually removed from cartridge ring 102, and may be ready for use (step 2026).

The present disclosure has been described and shown in considerable detail with reference to certain illustrative embodiments. Those skilled in the art will readily appreciate that other embodiments and variations and modifications of the disclosed embodiments are encompassed within the scope of the present disclosure. The description of the disclosed embodiments, combinations, and sub-combinations is not intended to convey that the disclosure requires features or combinations of features other than those expressly recited in the claims. Accordingly, the present disclosure is deemed to include all modifications and variations encompassed within the spirit and scope of the following appended claims.

We claim:

1. A method for simultaneously transferring a plurality of solid reagents to multiple cartridges, the method comprising the steps of:

(a) dispensing a plurality of solid reagents onto a top surface of a tray comprising a top surface having a plurality of depressions formed therein, each depression being configured to receive and hold a single one of the solid reagents, and a barrier wall projecting above and substantially surrounding the top surface, wherein the barrier wall includes a discontinuity at a first end of the tray;

(b) changing a plane of the tray so that each depression receives one of the solid reagents;

(c) removing any excess solid reagents through the discontinuity in the barrier wall at the first end of the tray;

(d) aligning each of multiple cartridges with a subset of the depressions, each cartridge including a plurality of wells, and each well being associated with one of the depressions;

(e) inverting the tray and the aligned cartridges so the solid reagents are simultaneously deposited into the wells of the cartridges;

(f) removing the cartridges from the tray;

(g) sealing the wells of the cartridges with a moisture barrier; and (h) deionizing the top surface of the tray prior to step (a).

2. The method of claim 1, wherein each of the plurality of solid reagents is a lyophilized reagent.

3. The method of claim 1, wherein each of the plurality of solid reagents has a generally spherical shape.

4. The method of claim 1, wherein step (d) comprises contacting a top surface of each cartridge with the top surface of the tray.

5. The method of claim 1, wherein each cartridge comprises two rows of wells, and where the depressions are arranged in sets of two rows corresponding to the two rows of wells in each cartridge.

6. The method of claim 1, wherein steps (a) to (e) are performed in a humidity controlled environment.

7. The method claim 6, wherein steps (a) to (e) are performed in a glove box.

8. The method of claim 1, wherein each cartridge is formed from a transparent plastic.

9. The method of claim 8, further comprising, after step (f) and prior to step (g), the step of inspecting each well of each cartridge to confirm that each well contains a solid reagent.

10. The method of claim 1, further comprising, after step (c) and prior to step (d), the step of inspecting the top surface of the tray to ensure that each well contains a single one of the solid reagents.

11. The method of claim 10, wherein the plurality of solid reagents and the top surface of the tray have contrasting colors.

12. The method of claim 10, wherein the inspecting step is a visual inspection.

13. The method of claim 10, further comprising the steps of removing a couplet from at least one of the wells and replacing the couplet with a single solid reagent, the couplet being a fused pair of the plurality of solid reagents provided to the top surface of the tray in step (a).

14. A method for simultaneously transferring a plurality of solid reagents to multiple cartridges, the method comprising the steps of:

(a) dispensing a plurality of solid reagents onto the top surface of a tray comprising a top surface having a plurality of depressions formed therein, each depression being configured to receive and hold a single one of the solid reagents, and a barrier wall projecting above and substantially surrounding the top surface, wherein the barrier wall includes a discontinuity at a first end of the tray;

(b) changing a plane of the tray so that each depression receives one of the solid reagents;

(c) removing any excess solid reagents through the discontinuity in the barrier wall at the first end of the tray;

(d) aligning each of multiple cartridges with a subset of the depressions, each cartridge including a plurality of wells, and each well being associated with one of the depressions;

(e) inverting the tray and the aligned cartridges so the solid reagents are simultaneously deposited into the wells of the cartridges;

(f) removing the cartridges from the tray;

(g) sealing the wells of the cartridges with a moisture barrier; and (h) prior to step (d), the step of pressing each cartridge onto a press plate for receiving and holding multiple cartridges in a frictional fit, the press plate comprising a receiving member comprising a generally flat bottom surface and a top surface having multiple sets of parallel ridges extending upward therefrom, wherein an outer edge of each ridge of each set of parallel ridges is chamfered, and wherein each set of parallel ridges is configured to engage a cartridge in a frictional fit and a handle member integrally formed with or joined to the receiving member, wherein opposed side walls of each cartridge engage the outer edges of the ridges of one set of parallel of ridges, thereby deflecting the opposed side walls outward so that the opposed side walls and the corresponding set of parallel ridges are in frictional engagement.

15. The method of claim 14, further comprising the step of deionizing the top surface of the tray prior to step (a).

16. A method for simultaneously transferring a plurality of solid reagents to multiple cartridges, the method comprising the steps of:

(a) dispensing a plurality of solid reagents onto the top surface of a tray comprising a top surface having a plurality of depressions formed therein, each depression being configured to receive and hold a single one of the solid reagents, and a barrier wall projecting above and substantially surrounding the top surface, wherein the barrier wall includes a discontinuity at a first end of the tray;

(b) changing a plane of the tray so that each depression receives one of the solid reagents;

(c) removing any excess solid reagents through the discontinuity in the barrier wall at the first end of the tray;

(d) aligning each of multiple cartridges with a subset of the depressions, each cartridge including a plurality of wells, and each well being associated with one of the depressions;

(e) inverting the tray and the aligned cartridges so the solid reagents are simultaneously deposited into the wells of the cartridges;

(f) removing the cartridges from the tray;

(g) sealing the wells of the cartridges with a moisture barrier; and (h) prior to step (d), the steps of:

supporting each cartridge in one of multiple slots of a cartridge ring, the cartridge ring having an inner surface and an outer surface, wherein the inner surface defines the multiple slots, each slot having a first end and a second end configured to support a first end and a second end of a corresponding cartridge, respectively; and while each cartridge is supported by the corresponding slot, pressing each cartridge onto a press plate for receiving and holding multiple cartridges in a frictional fit, the press plate comprising a receiving member comprising a generally flat bottom surface and a top surface having multiple sets of parallel ridges extending upward therefrom, wherein an outer edge of each ridge of each set of parallel ridges is chamfered, and wherein each set of parallel ridges is configured to engage a cartridge in a frictional fit and a handle member integrally formed with or joined to the receiving member, wherein opposed side walls of each cartridge engage the outer edges of the ridges of one of the parallel sets of ridges, thereby deflecting the opposed side walls outward so that the opposed side walls and the corresponding parallel set of ridges are in frictional engagement, and wherein the top surface of the press plate is configured to receive the cartridge ring so that each slot is aligned with one of the parallel sets of ridges during step (d).

17. The method of claim 16, wherein at least a portion of the cartridge ring is contained within the barrier wall of the tray during step (d).

18. The method of claim 16, wherein the cartridge ring is magnetically attracted to the tray during steps (d) and (e).

19. The method of claim 16, wherein the multiple cartridges are supported by the cartridge ring during step (f).

20. The method of claim 19, wherein the multiple cartridges are supported by the cartridge ring during step (g).

* * * * *